US012758459B2

(12) United States Patent
Li

(10) Patent No.: US 12,758,459 B2
(45) Date of Patent: Oct. 13, 2026

(54) ARTIFICIAL INTELLIGENCE ENABLED ROLLATOR

(71) Applicant: Hua Harry Li, Palo Alto, CA (US)

(72) Inventor: Hua Harry Li, Palo Alto, CA (US)

( * ) Notice: Subject to any disclaimer, the term of this patent is extended or adjusted under 35 U.S.C. 154(b) by 39 days.

(21) Appl. No.: 18/738,939

(22) Filed: Jun. 10, 2024

(65) Prior Publication Data

US 2024/0407965 A1 Dec. 12, 2024

Related U.S. Application Data

(60) Provisional application No. 63/507,112, filed on Jun. 9, 2023.

(51) Int. Cl.
*A61H 3/04* (2006.01)
*G05B 13/02* (2006.01)
(Continued)

(52) U.S. Cl.
CPC ............ *A61H 3/04* (2013.01); *G05B 13/027* (2013.01); *G05D 1/222* (2024.01); *G05D 1/24* (2024.01); *G05D 1/622* (2024.01); *A61H 2003/043* (2013.01); *A61H 2003/046* (2013.01); *A61H 2201/0161* (2013.01); *A61H 2201/0173* (2013.01); *A61H 2201/1215* (2013.01); *A61H 2201/1673* (2013.01);
(Continued)

(58) Field of Classification Search
CPC ................ A61H 3/04; A61H 2003/043; A61H 2003/046; A61H 2201/0161; A61H 2201/0173; A61H 2201/1215; A61H 2201/1673; A61H 2201/5041; A61H 2201/5058; A61H 2201/5064; A61H 2201/5084; A61H 2201/5092; A61H 2201/5097; G05B 13/027; G05D 1/222; G05D 1/24; G05D 1/622; G05D 2101/15; G05D 2105/24; G05D 2111/17; G05D 1/2247; G05D 1/243; G05D 2111/10; G05D 2111/52
See application file for complete search history.

(56) References Cited

U.S. PATENT DOCUMENTS

| | | | |
|---|---|---|---|
| 7,383,107 | B2 | 6/2008 | Fehr et al. |
| 7,641,210 | B2 | 1/2010 | Babcock et al. |

(Continued)

OTHER PUBLICATIONS

Zhao, Xiaoyang, et al., A Smart Robotic Walker With Intelligent Close-Proximity Interaction Capabilities for Elderly Mobility Safety, Pub Med, Neurorobot, 2020, doi: 10.3389/fnbot.2020.575889. PMID: 33192437; PMCID: PMC7642877.

(Continued)

*Primary Examiner* — Navid Z. Mehdizadeh

(57) ABSTRACT

The present invention is a battery-powered, remote-controllable rollator with embedded computer systems and computer vision system. The present invention recognizes the user's face by using artificial intelligence technology, namely, the deep convolutional neural networks, and uses that information to localize the rollator's position in relation to the user. An artificial intelligence algorithm computes the motion path and drives the present invention to the user. The present invention can automatically stop once approached to a preset stopping distance from the user. Once stationary, the present invention can then be used by the user.

20 Claims, 17 Drawing Sheets

(51) Int. Cl.

| | |
|---|---|
| ***G05D 1/222*** | (2024.01) |
| ***G05D 1/24*** | (2024.01) |
| ***G05D 1/622*** | (2024.01) |
| ***G05D 101/15*** | (2024.01) |
| ***G05D 105/22*** | (2024.01) |
| ***G05D 111/10*** | (2024.01) |

(52) U.S. Cl.

CPC ................ *A61H 2201/5041* (2013.01); *A61H 2201/5058* (2013.01); *A61H 2201/5064* (2013.01); *A61H 2201/5084* (2013.01); *A61H 2201/5092* (2013.01); *A61H 2201/5097* (2013.01); *G05D 2101/15* (2024.01); *G05D 2105/24* (2024.01); *G05D 2111/17* (2024.01)

(56) References Cited

U.S. PATENT DOCUMENTS

| | | | | |
|---|---|---|---|---|
| 8,087,684 | B2 | 1/2012 | Bloswick et al. | |
| 2005/0279551 | A1 | 12/2005 | LoPresti | |
| 2017/0266069 | A1 | 9/2017 | Lozano et al. | |
| 2018/0344560 | A1* | 12/2018 | Zheng | A61H 3/02 |
| 2019/0365592 | A1* | 12/2019 | Norton | A61H 3/04 |
| 2020/0284883 | A1* | 9/2020 | Ferreira | G01S 7/4815 |
| 2022/0409453 | A1* | 12/2022 | Nicolao | A61G 5/045 |
| 2023/0013606 | A1* | 1/2023 | Pasqui | A61H 3/04 |
| 2023/0176558 | A1* | 6/2023 | Mhatre | A61G 5/10<br>702/183 |

OTHER PUBLICATIONS

Guo, Xinge, et al., Artificial Intelligence-Enabled Caregiving Walking Stick Powered by Ultra-Low-Frequency Human Motion, Pud Med, ACS Nano, 2021, 28; 15(12): 19054-19069. doi: 10.1021/acsnano. 1c04464. Epub Jul. 26, 2021. PMID: 34308631.

Morone, Giovanni, et al., Overground walking training with the i-Walker, a robotic servo-assistive device, enhances balance in patients with subacute stroke: a randomized controlled trial, Journal of NeuroEngineering and Rehabilitation, 2016, 13;47, DOI 10.1186/s12984-016-0155-4.

Mhatre, Anand; Loew, Cassandra; Yurtsever, Ekim; Mair, Colin. “Power wheelchair usage and repair are associated: a retrospective analysis.” Disability and Rehabilitation: Assistive Technology, 2025, vol. 20, No. 1, pp. 127-134. Taylor & Francis / Informa UK Limited, United Kingdom. (Submitted Dec. 18, 2023; Accepted May 6, 2024; Published online May 16, 2024.) DOI: 10. 1080/17483107.2024. 2353861.

* cited by examiner

FIG. 13
9:55
Wi-Fi Settings
Input W100 IP Address
192.168.0.201
Save
Home
Drive
MyFacial
Settings
Help

ARTIFICIAL INTELLIGENCE ENABLED ROLLATOR

FIELD OF THE INVENTION

The present invention relates generally to rollators for aiding the elderly and disabled. Particularly, the present invention is a battery-powered, remote-controllable rollator that recognizes the user by their face and self-drives to the user using a system of sensors and artificial intelligence.

BACKGROUND OF THE INVENTION

Artificial intelligence technology has been applied in the areas of electric wheelchair design, and Artificial Intelligence-Enabled Care-giving Walking Stick design (X. Guo et al 2021, https://pubmed.ncbi.nlm.nih.gov/34308631/), and "A Smart Robotic Walker With Intelligent Close-Proximity Interaction Capabilities for Elderly Mobility Safety" (X. Zhao, 2020, https://pubmed.ncbi.nlm.nih.gov/33192437/). The later design is to provide the user with the ability to better interact with the structured indoor environment. Another invention is the design of a walker with a small computer having an Internet connection. The walker has sensors to measure a person's gait patterns and detect an abnormal situation to send an alert signal for medical assistance (G. Morone, 2016, https://www.ncbi.nlm.nih.gov/pmc/articles/PMC4880987/).

An objective of the present invention is to provide an artificial intelligence enabled, battery-powered, remote-controllable rollator or walker that recognizes the user by their face and self-drives to the user using a system of sensors and artificial intelligence.

SUMMARY OF THE INVENTION

The present invention is a battery-powered, remote-controllable, motorized rollator with an embedded computer system and a computer vision system. The present invention recognizes the user's face by using artificial intelligence technology, namely, the deep convolutional neural networks, and uses that information to localize the rollator's position in relation to the user. An artificial intelligence algorithm computes the motion path and drives the present invention to the user. The present invention can automatically stop once approached to the user. Once stationary, the present invention can then be used by the user.

DETAILED DESCRIPTION OF THE INVENTION

Figure 1:
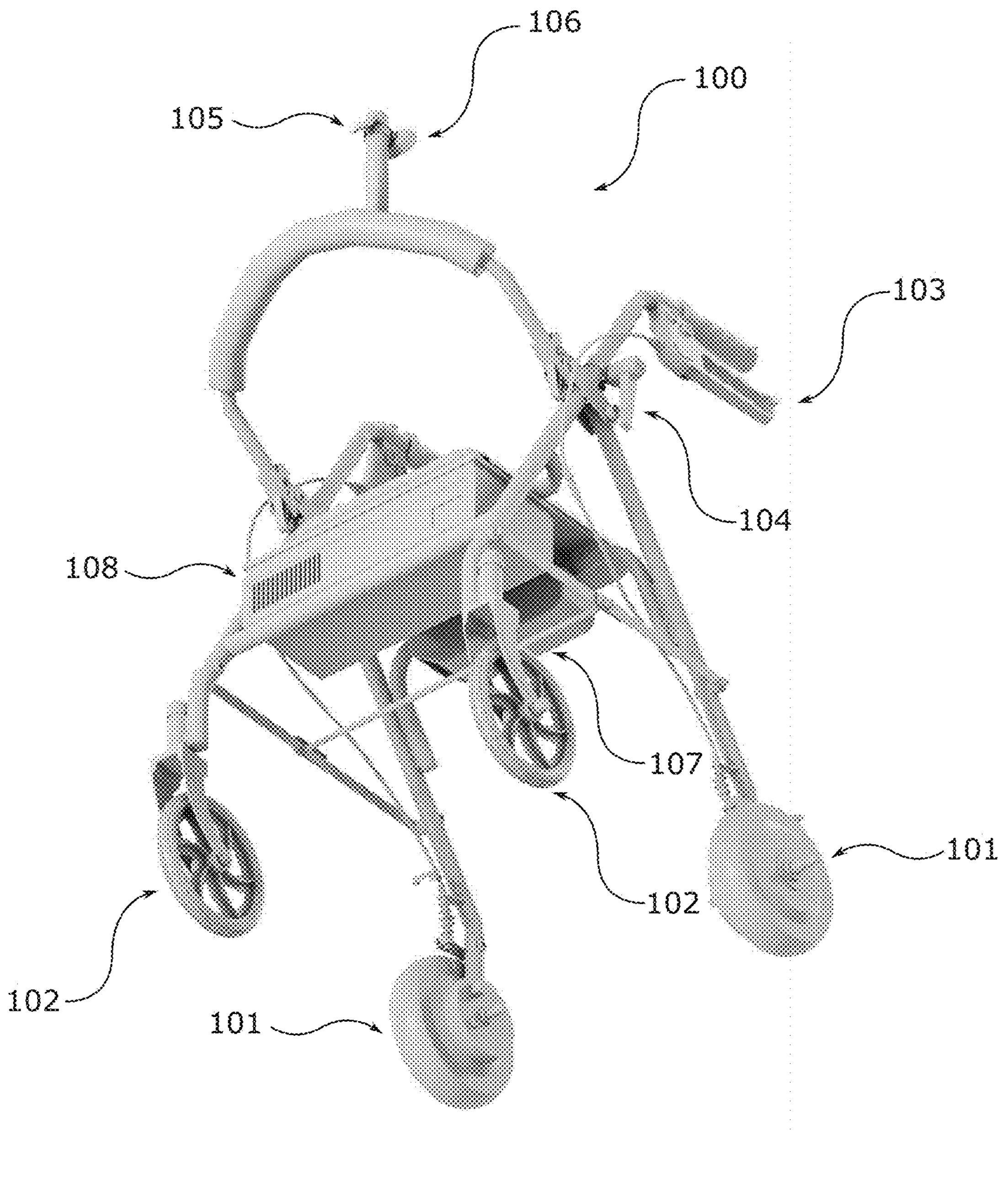
FIG. 1 is a bottom front perspective view of the present invention.
Figure 2:
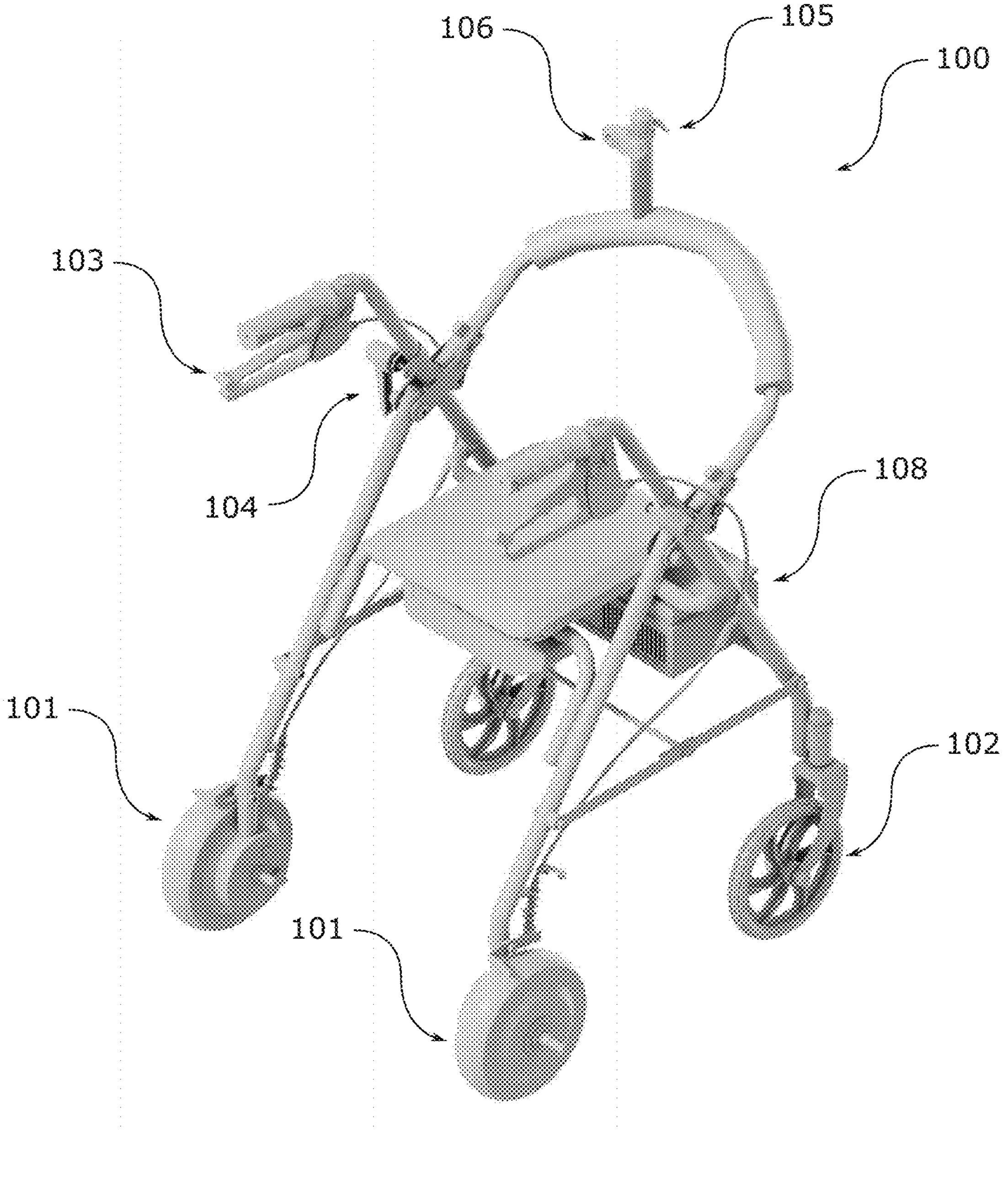
FIG. 2 is a top rear perspective view of the present invention.
Figure 3:
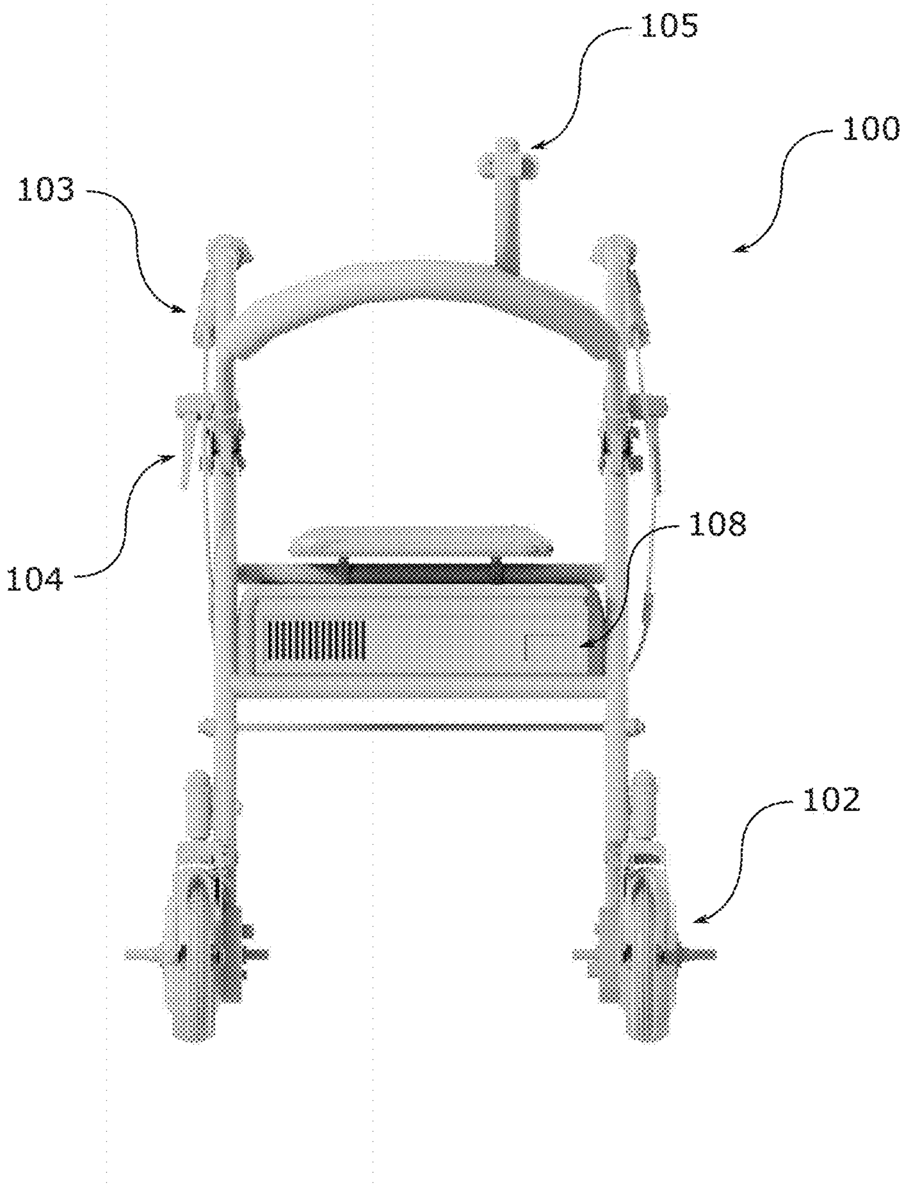
FIG. 3 is a front elevational view of the present invention.
Figure 4:
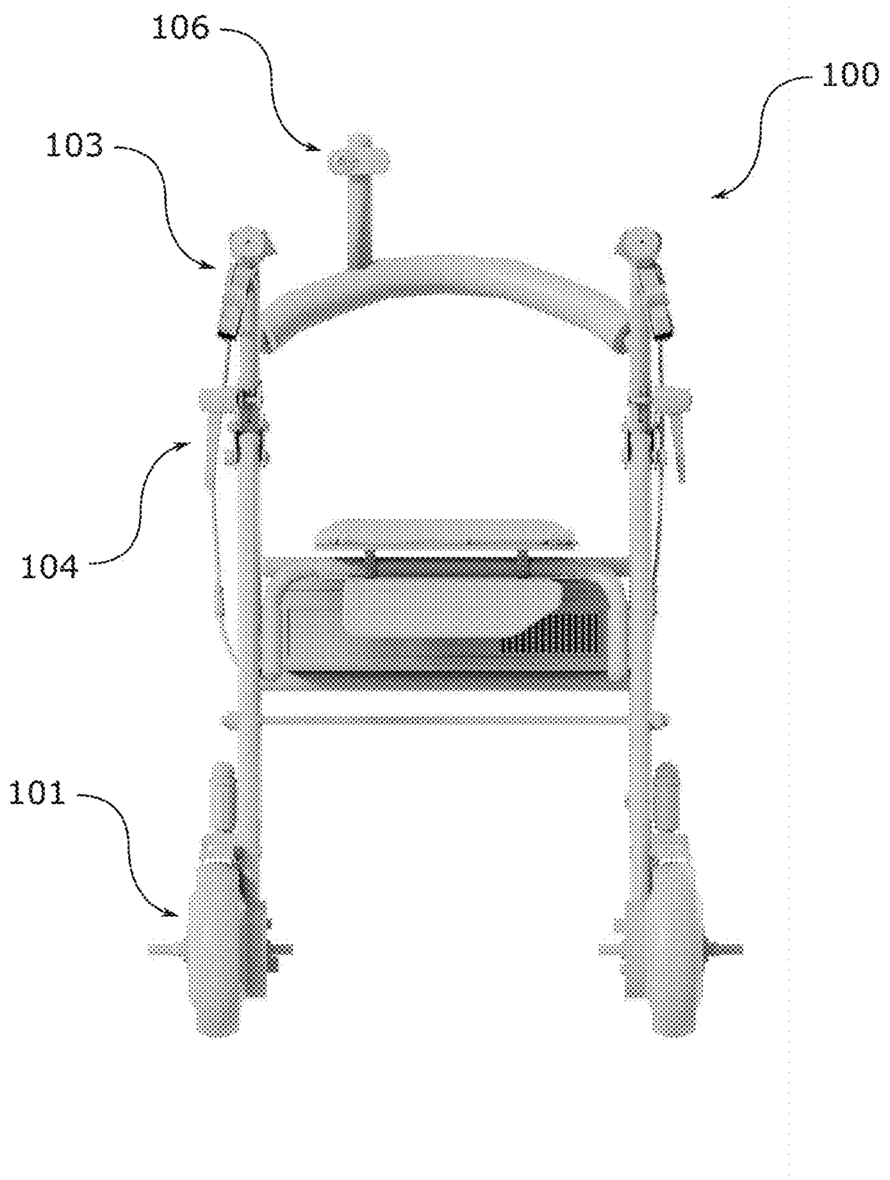
FIG. 4 is a rear elevational view of the present invention.
Figure 5:
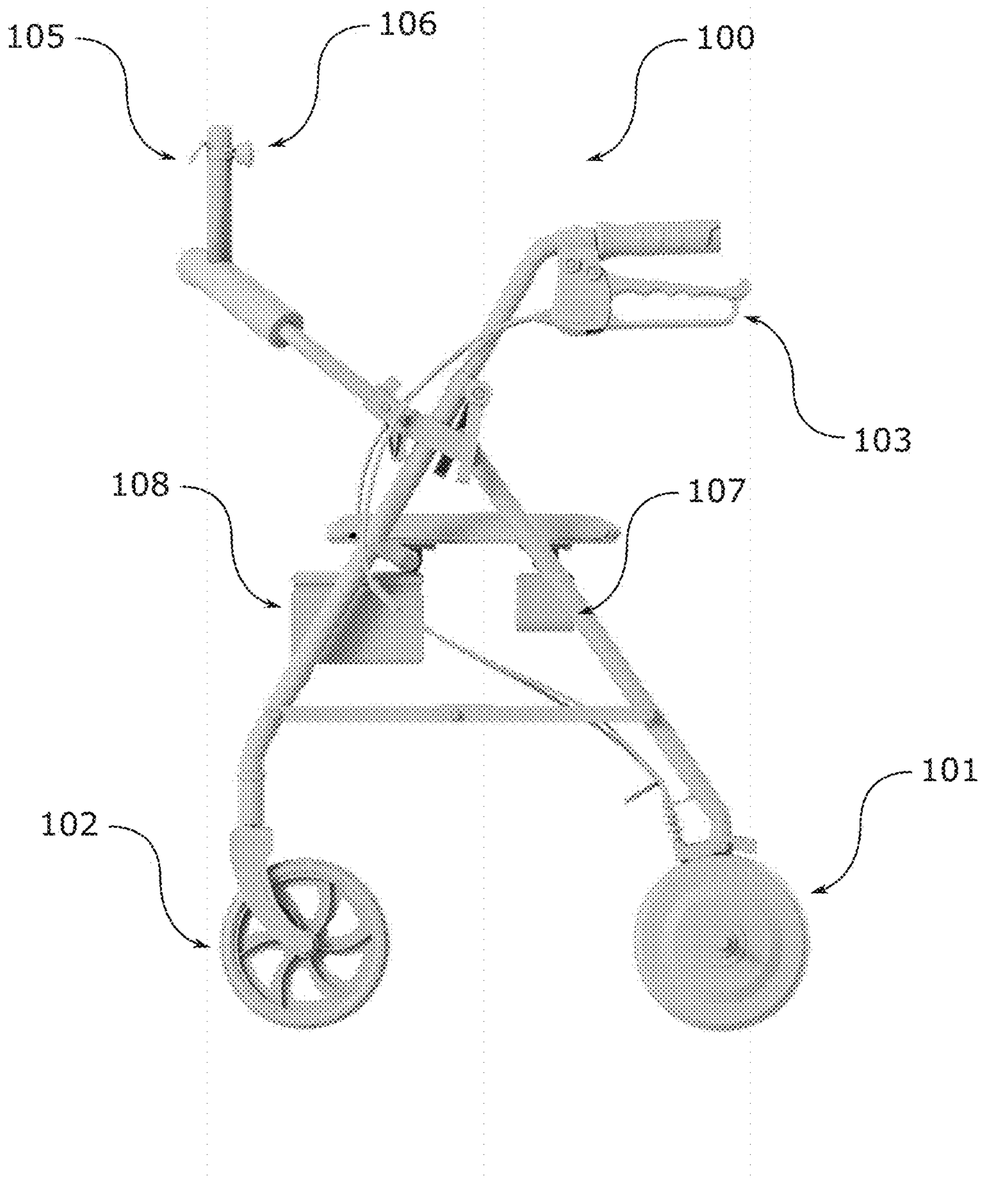
FIG. 5 is a right elevational view of the present invention.
Figure 6:
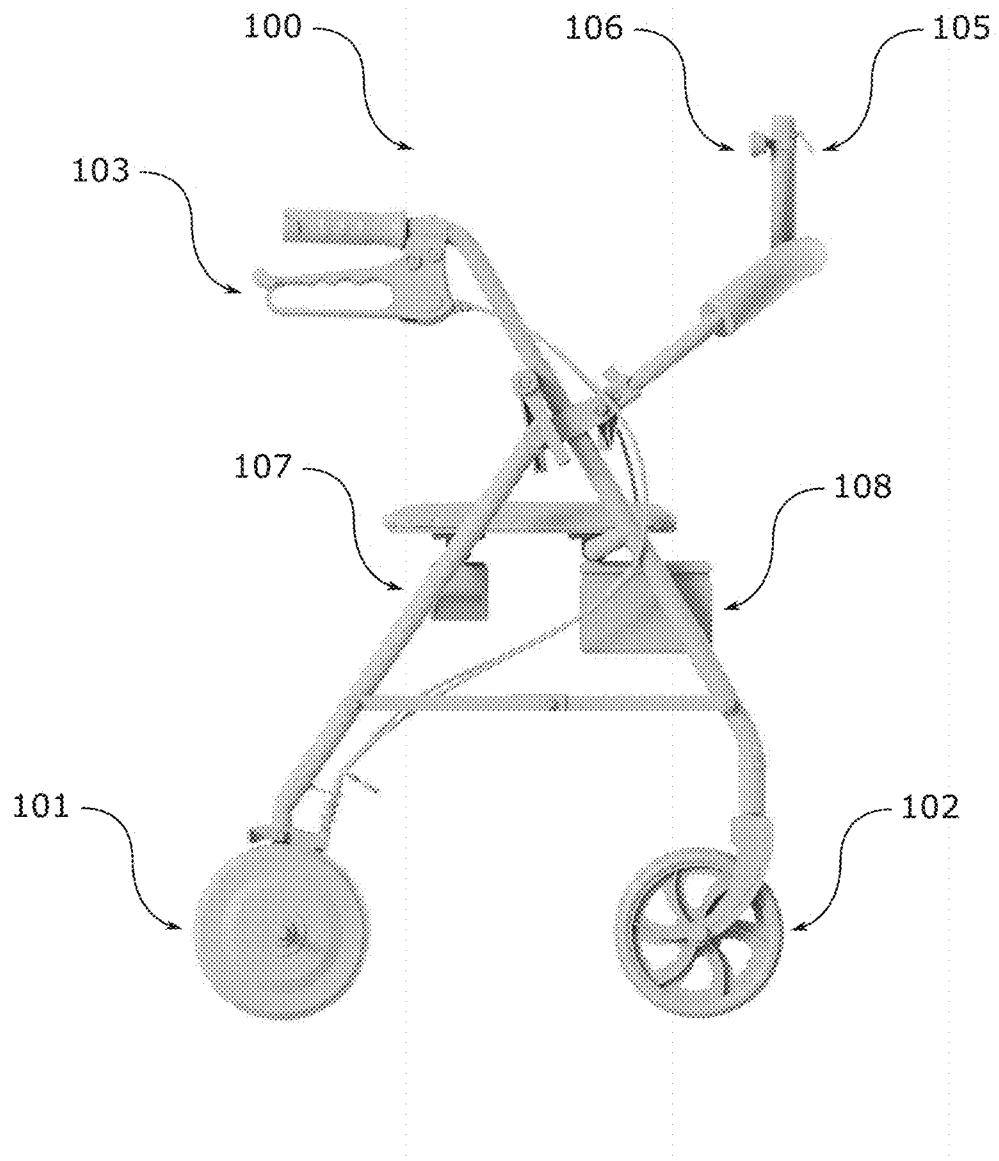
FIG. 6 is a left elevational view of the present invention.
Figure 7:
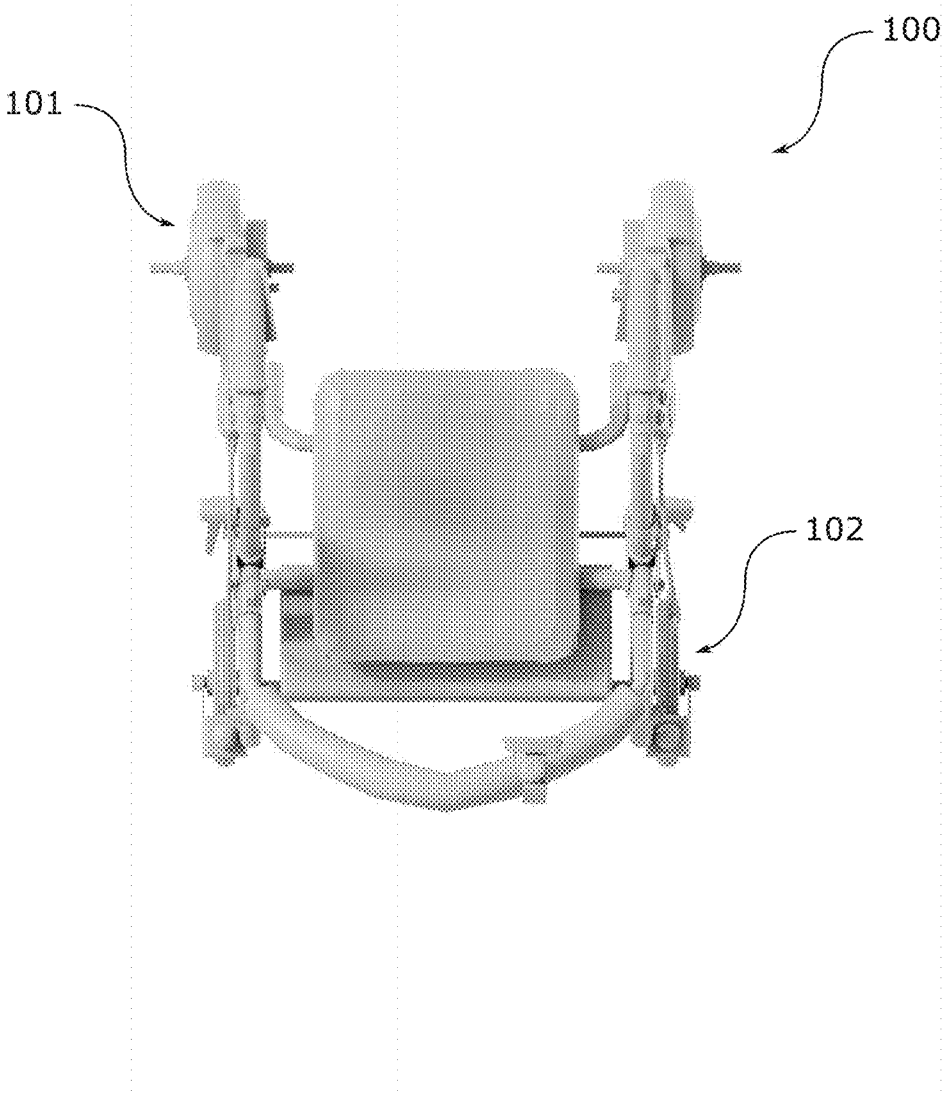
FIG. 7 is a top plan view of the present invention.
Figure 8:
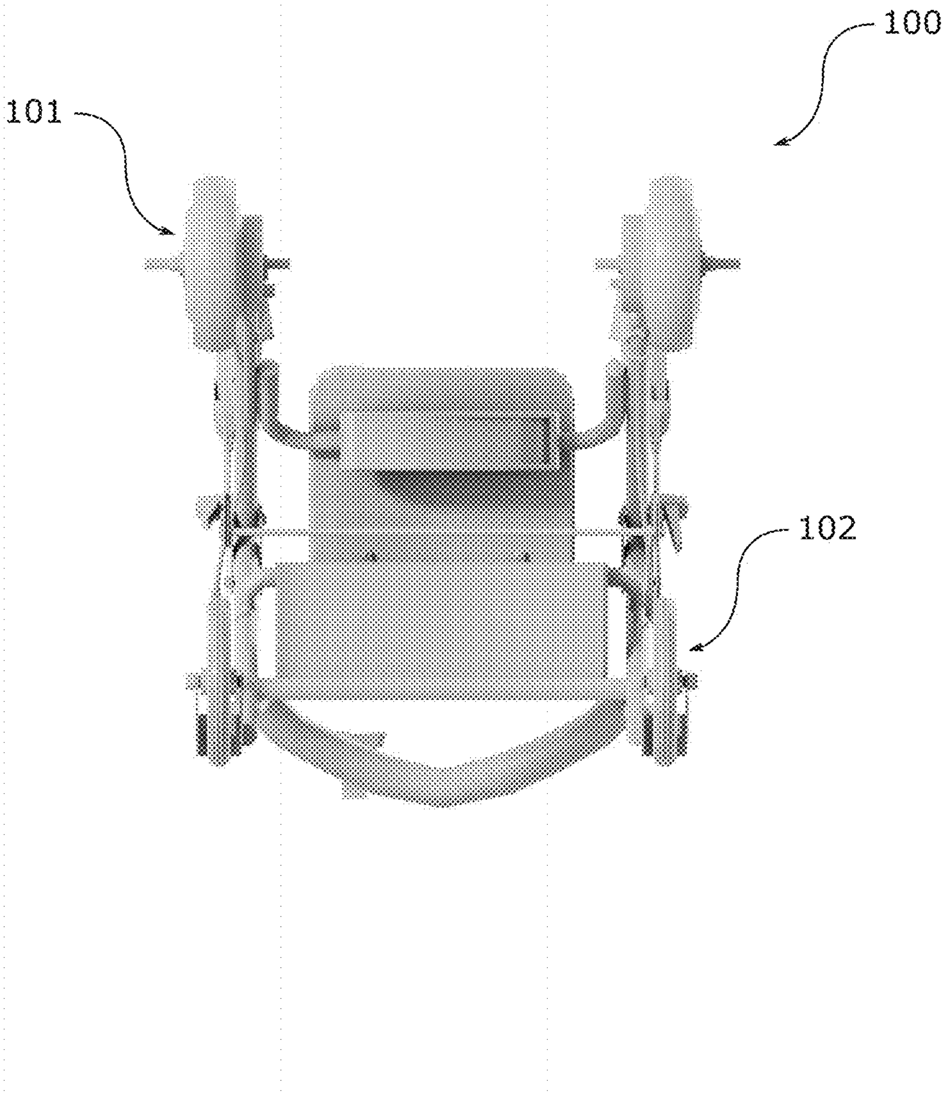
FIG. 8 is a bottom plan view of the present invention.

All illustrations of the drawings are for the purpose of describing selected versions of the present invention and are not intended to limit the scope of the present invention.

As shown in FIG. 1-8, the present invention is a battery-powered, remote-controllable rollator comprising a rollator 100, a plurality of motorized wheels 101, a plurality of swivel wheels 102, a plurality of mechanical hand brakes 103, an emergency battery power switch 104, a front color camera 105, a rear color camera 106, a battery 107, and an instrument panel 108 housing a control module further comprising a plurality of sensors including a magnetometer, an acceleration sensor, an impact detection sensor, and a plurality of proximity sensors.

Figure 9:
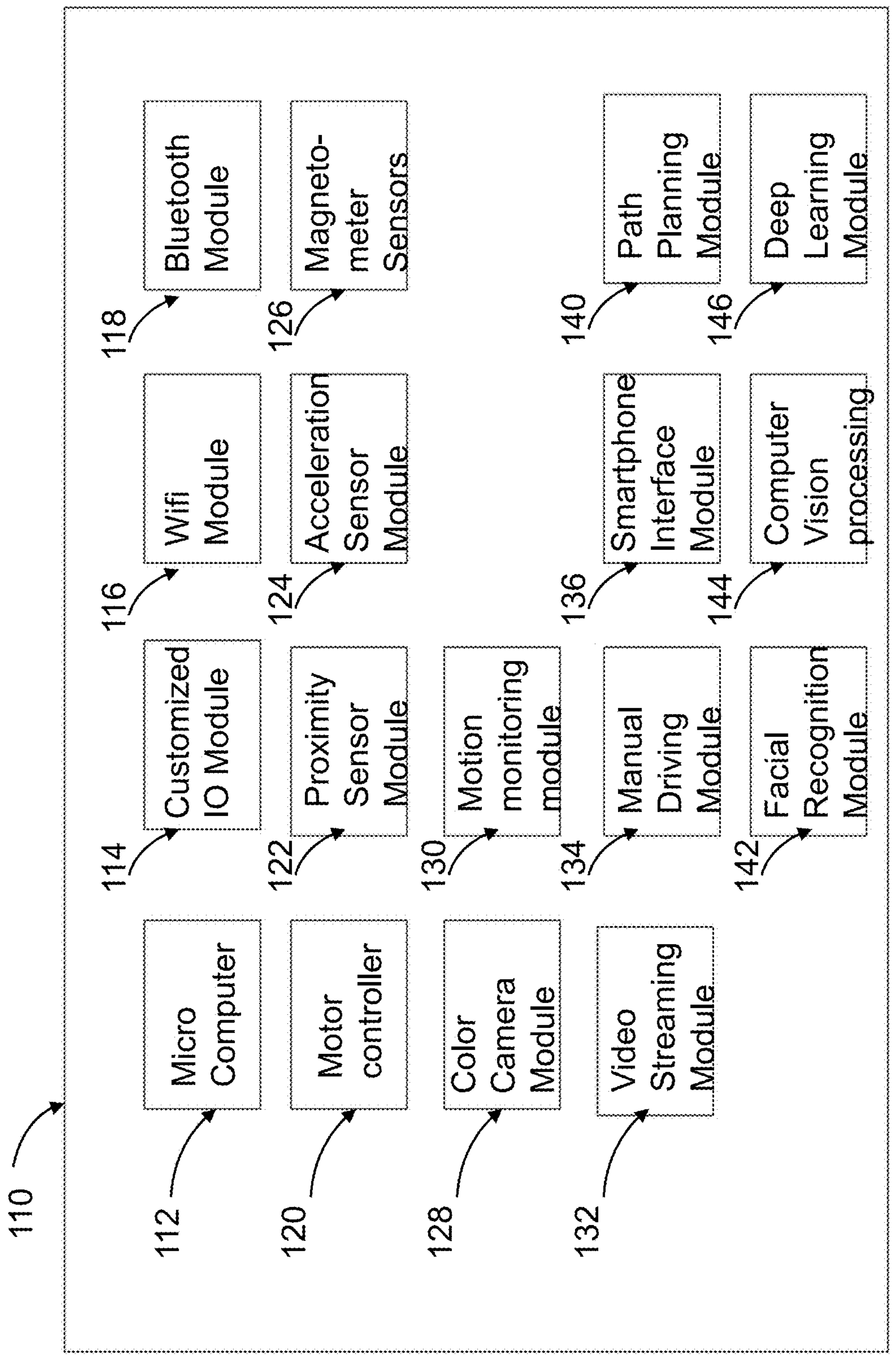
FIG. 9 is a diagram of the control module of the present invention.

FIG. 9 illustrates said control module 110 of said rollator 100. The term "module" or the term "controller" may be replaced with the term "electronics circuit" or "software program." The term "module" may refer to, be part of, or include microprocessor hardware which executes the software program or memory hardware participating in the microprocessor processing and storing code executed by an embedded computer. The software program is written to provide each module functionality from 112 to 146 as well as integrated functionality of the control module 110. The control module 110 is housed within the instrument panel 108. The control module 110 further comprises an embedded computer 112 which has real time operating systems, executes programs to realize artificial intelligence function, such as path planning, facial recognition, motor control for self driving of the rollator 100. For example, the user can use his/her smartphone application to communicate with said control module 110 via WiFi module 116 or Bluetooth module 118 to drive said rollator 100 or use the color camera module 128 to capture the user's face. The computer vision module 144 performs feature extraction tasks to build high dimensional feature vectors to feed feature vectors to the deep learning module 146 for further processing and feature classification, in addition to online learning and adaptation for better feature classification. Said feature vectors of the processed image are fed into the facial recognition module 142 for facial recognition. To enhance the quality of the feature vector extraction and deep learning function, the computer vision module 144 conducts image pre-processing such as image enhancement, color balancing and segmentation, contour analysis, and topological and geometric features processing. As a result, the user's facial signature is positively identified by the facial recognition module 142. The control module further comprises a smartphone interface module 136 which consists of the communication protocols, software processing unit and the user interface system 400.

Figure 10:
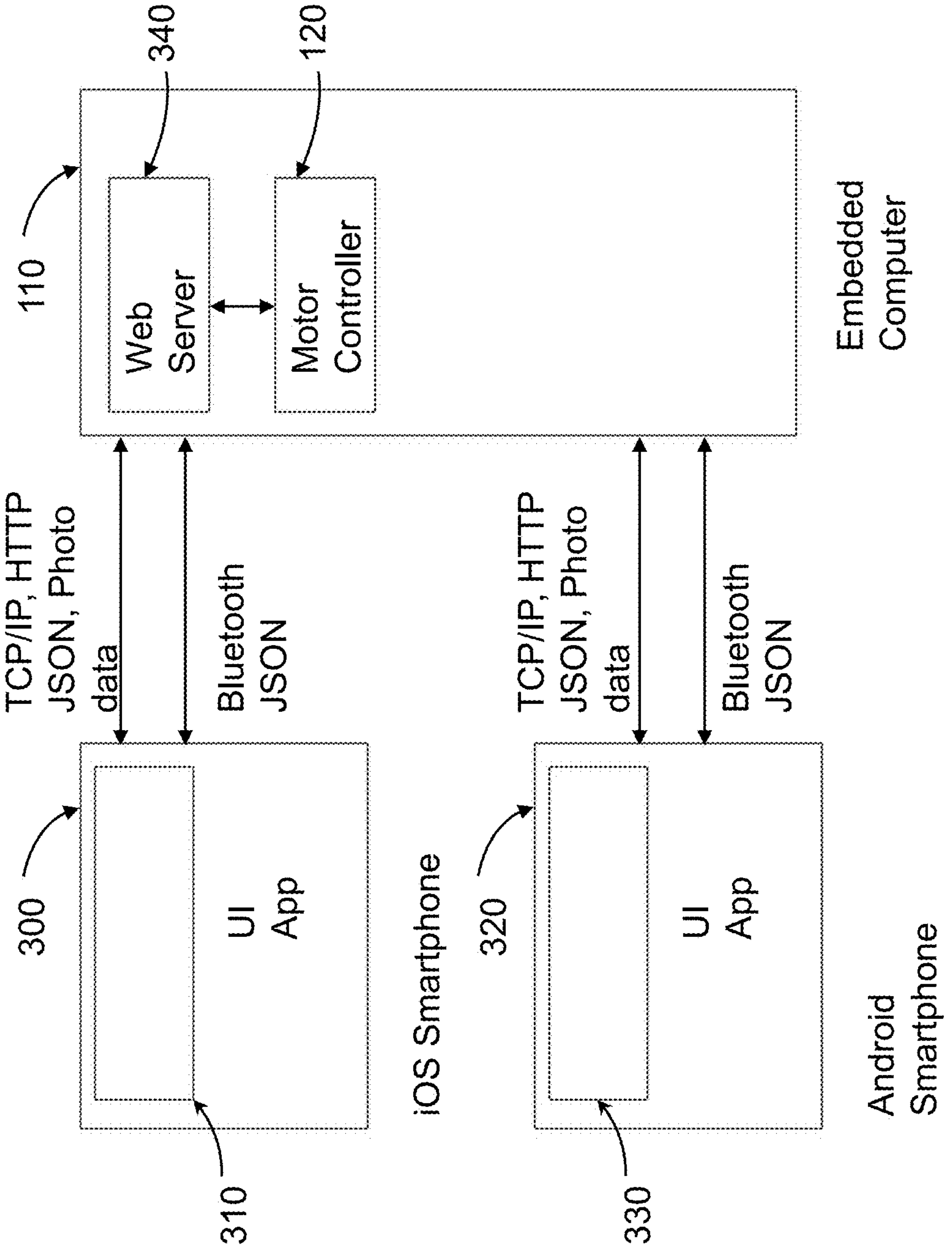
FIG. 10 is a diagram of smartphone and server architecture of the present invention.

If the user requests self-driving via smartphone 300 or 320 by using a smartphone application 310 or 330 depicted in FIG. 10, the request is received by the WiFi module 116, then parsed and processed by a web server 340. The embedded computer module 112 communicates with the path planning module 140, where navigation parameters are computed before a set of motion commands is generated and sent back to the embedded computer. The embedded computer communicates with the customized IO module 114, which is configured to customize settings of the communication protocols, such as Modbus, to the motor controller module 120 to drive said motorized wheels 101 to reach the user. The stopping criteria is determined by the software program of the customized IO module 114. Once the stopping criteria is satisfied, a stop command is issued to halt said motorized wheels 101.

Figure 11:
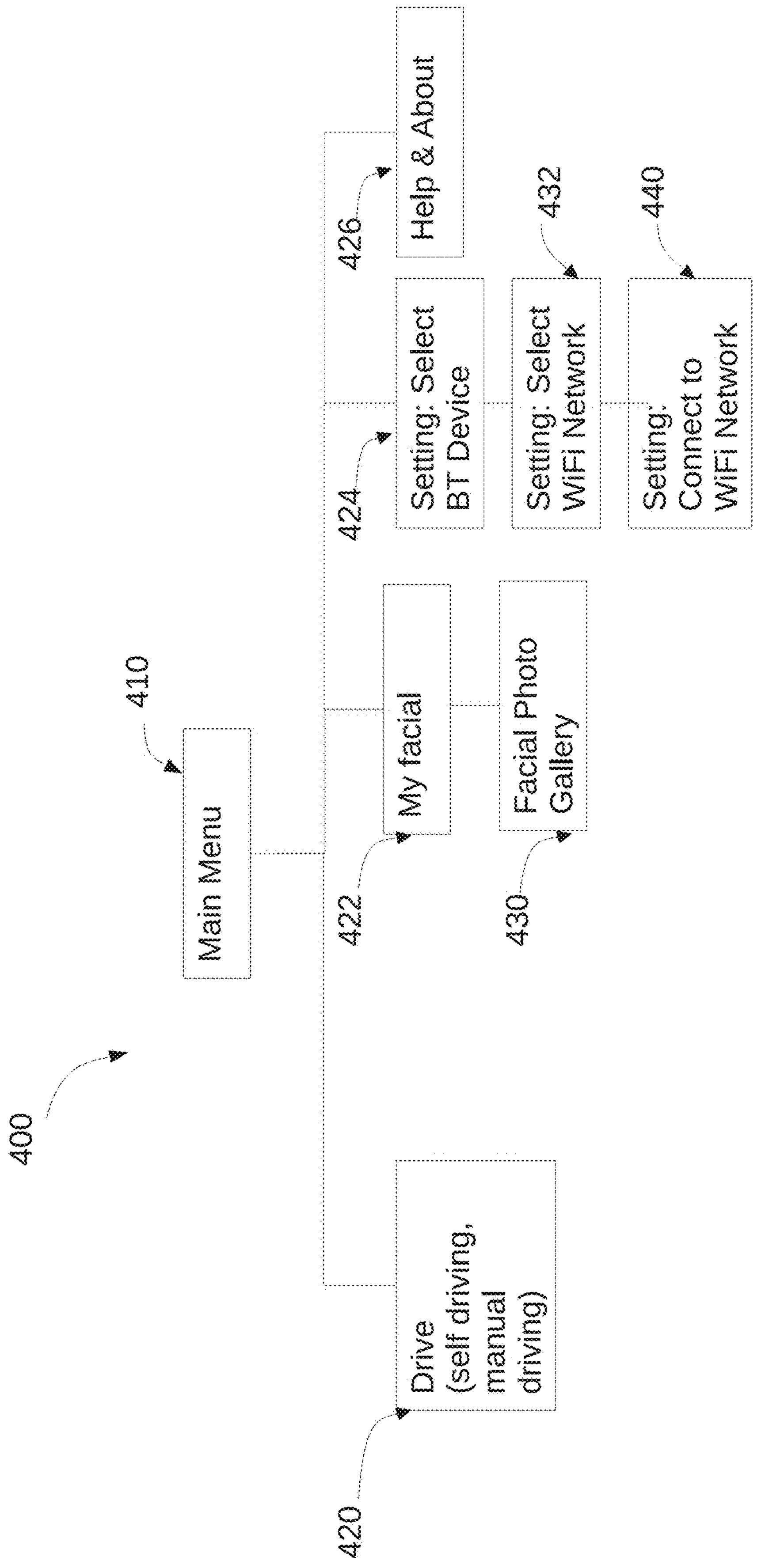
FIG. 11 is a diagram of the user interface system of the present invention.
Figure 12:
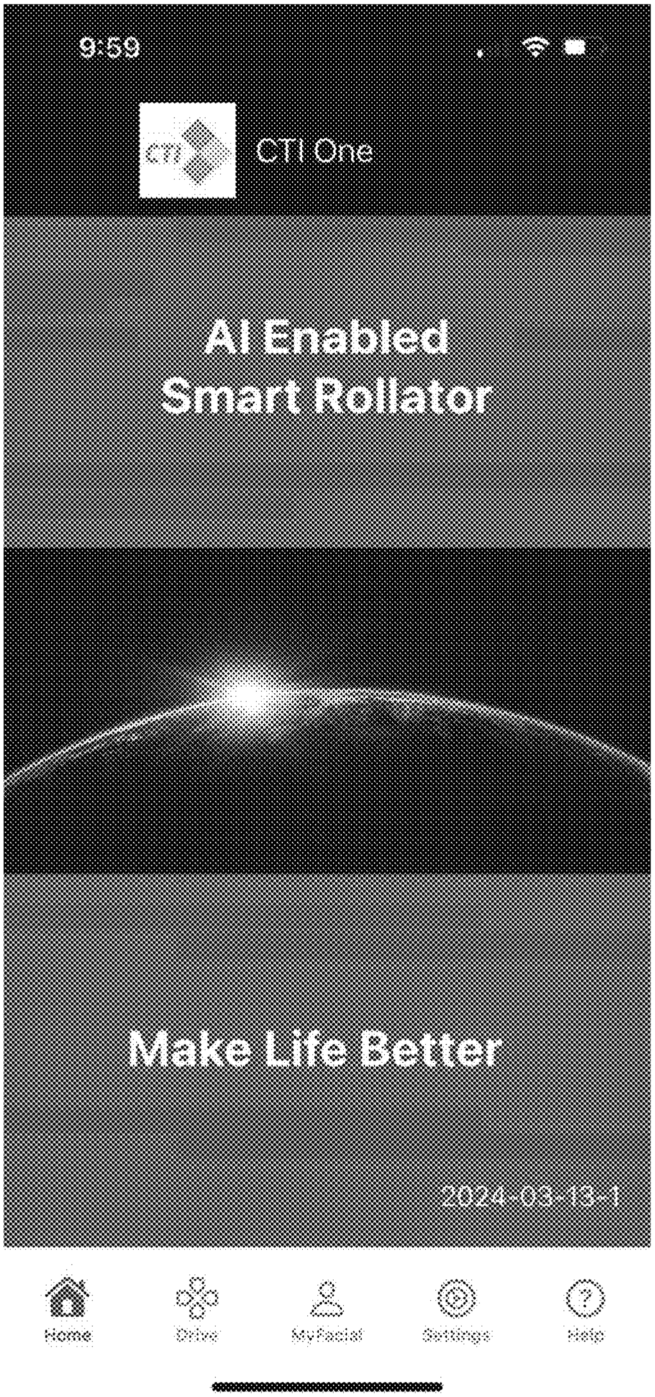
FIG. 12 is an illustration of the software graphical user interface of the present invention.
Figure 13:
FIG. 13 is an illustration of the software graphical user interface of the present invention related to setting WiFi configuration and connections.
Figure 14:
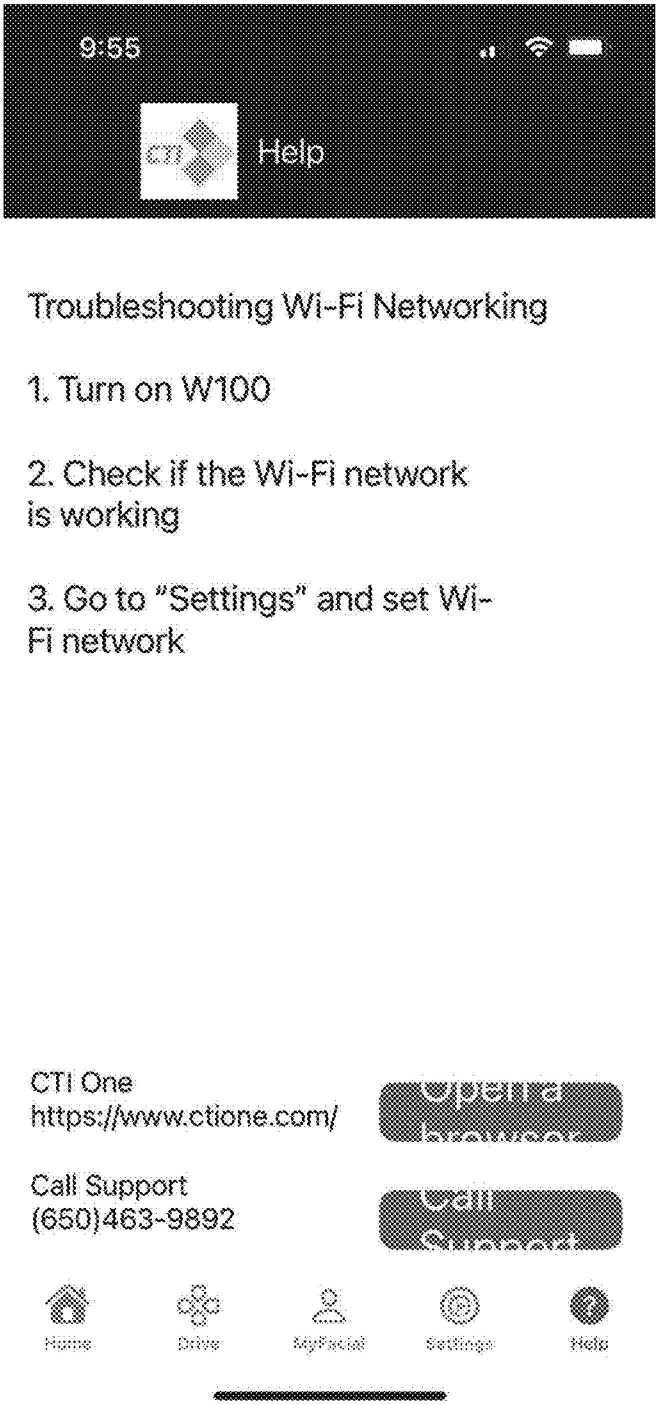
FIG. 14 is an illustration of the software graphical user interface of the present invention related to WiFi troubleshooting.
Figure 15:
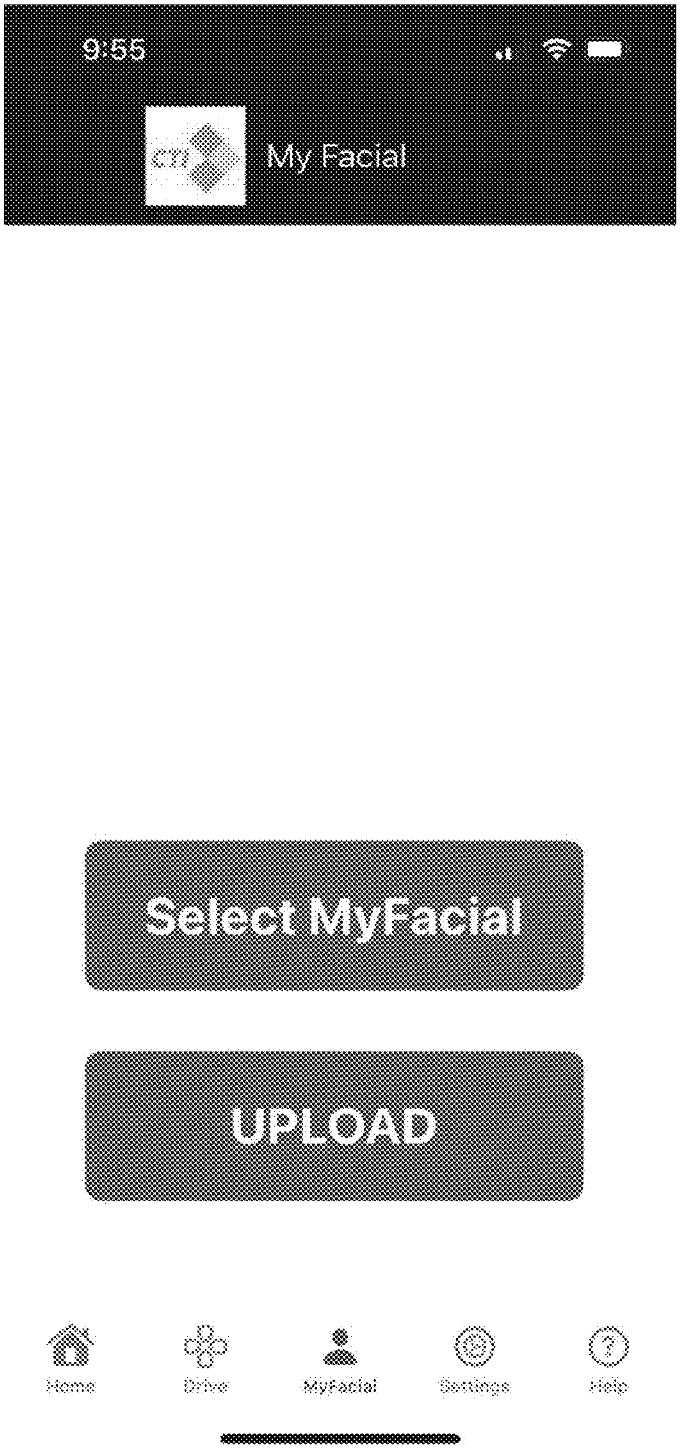
FIG. 15 is an illustration of the software graphical user interface of the present invention related to facial recognition input.
Figure 16:
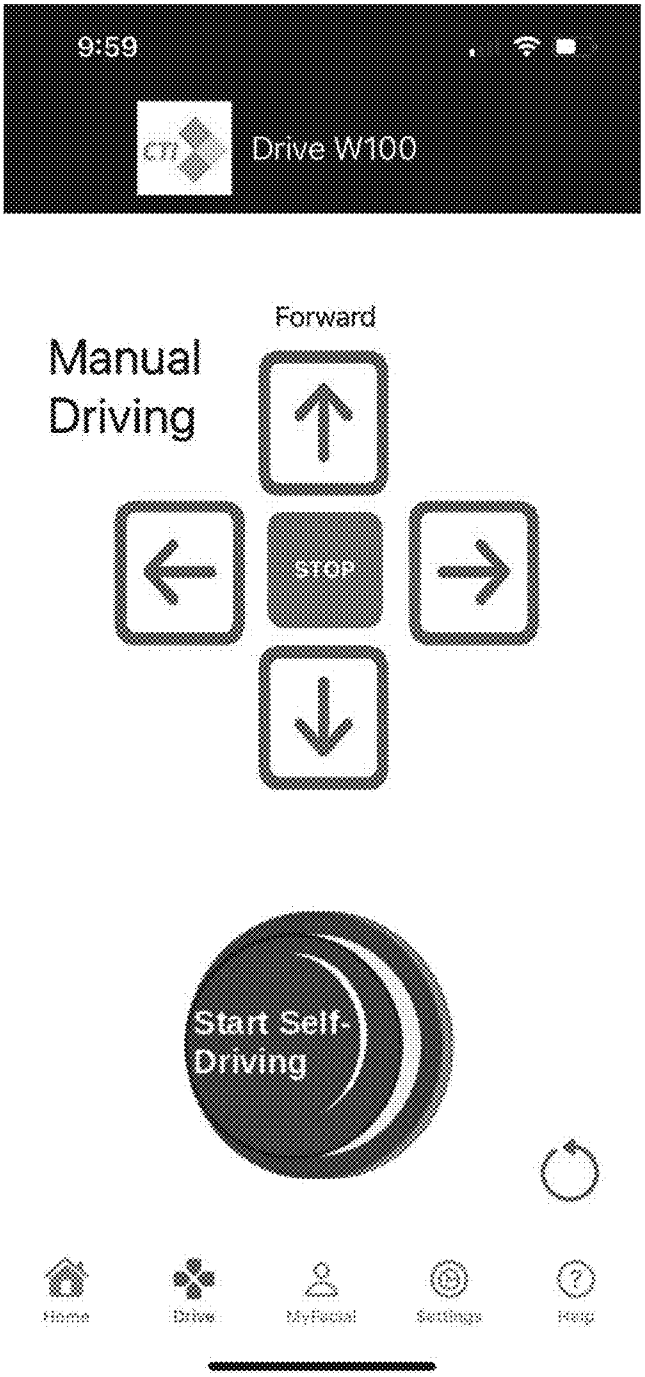
FIG. 16 is an illustration of the software graphical user interface of the present invention related to manual remote control driving.

In the preferred embodiment of the present invention, the user can use his/her smartphone 300 or 320 to choose the smartphone application of the user interface system 400 as depicted in FIG. 11 to execute a remote control function. The main page of the user interface system 410 whose implementation is given in FIG. 12 comprises at least five selection buttons for the selection of user interface functions. The buttons, as shown from the left to right in FIG. 12, relate to: main page 410; drive page 420 for executing driving commands; MyFacial page 422 to take a facial photo and upload said photo; setting page 424 to configure Bluetooth, 432 to configure Wi-Fi, and 440 to connect to WiFi wireless communication; and help page 426 to provide instructions for troubleshooting. To operate the remote control or self-driving function of the rollator 100, a user starts from the main page 410; configures the Bluetooth wireless communications with page 424, depicted in FIG. 13, and WiFi wireless communications with 432; and activates the configured WiFi connection with 440. Once wireless settings are configured, the user navigates to my facial page 422, take a facial photo of himself or herself or select an existing facial photo with 430, then upload said photo as depicted in FIG. 15. Successfully uploading an acceptable photo completes the user registration of the rollator 100, enabling facial recognition using the chosen facial photo. Once facial recognition is enabled, the user can navigate to drive page 420 as depicted in FIG. 16 to select driving commands, such as forward, backward, left, right, or self-driving. The user can navigate to the help page 426 to get information as shown in FIG. 14 if the user has any questions.

Figure 17:
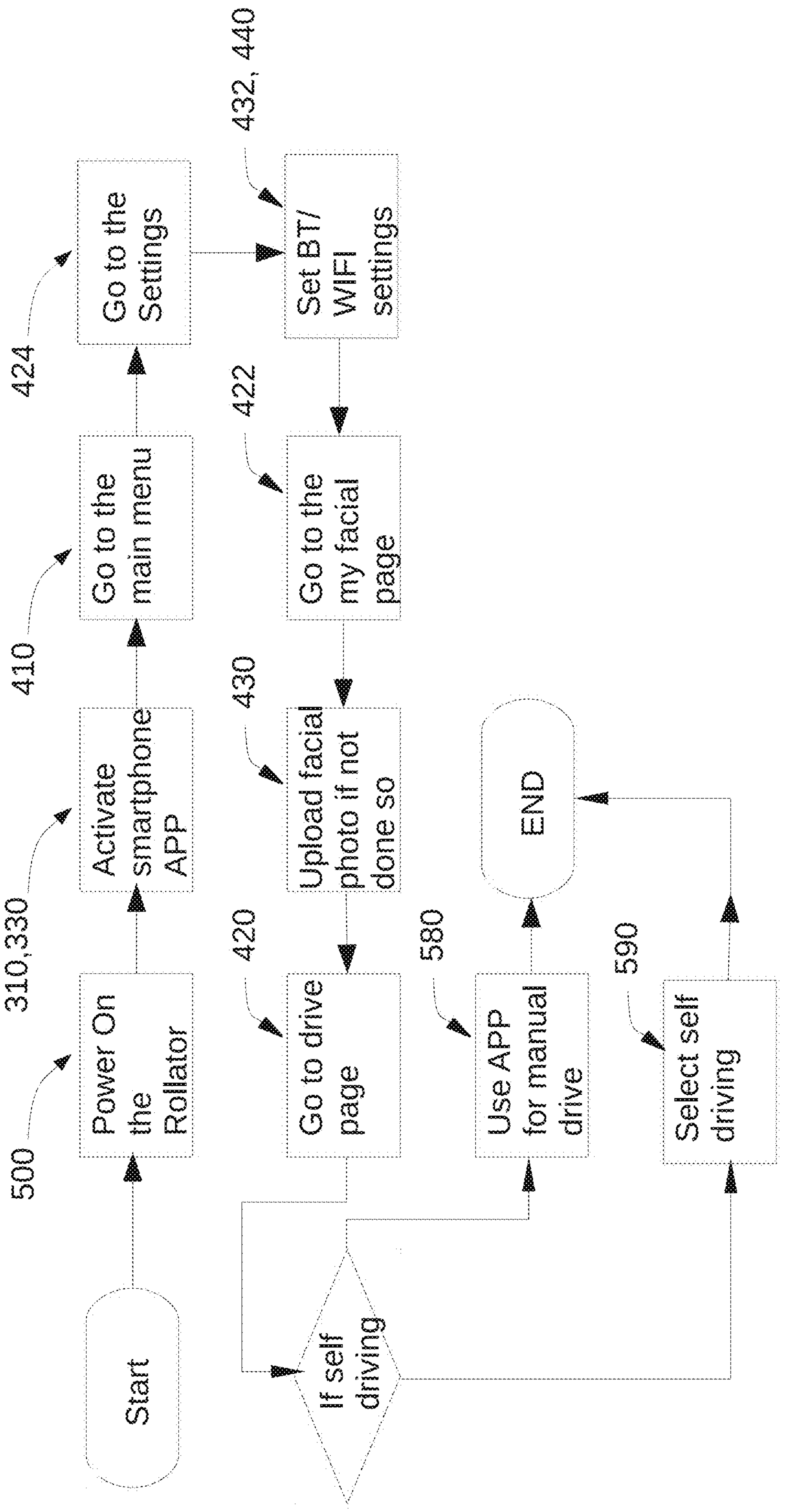
FIG. 17 is a flow diagram showing operation procedures according to an embodiment of the present invention.

FIG. 17 is a flow diagram showing operation procedures according to an embodiment of the present invention. The procedure begins by powering up the rollator 100, then activate smartphone program 310 for iPhone or 330 for Android phone. Once the application program starts, the user navigates to the main menu 410, configures Bluetooth 424 and WiFi 432, and activates the WiFi network 440. Next, the user navigates to my facial page 422, takes a face photo of himself/herself or selects an existing facial photo 430, and clicks the button on the page to upload the photo as depicted in FIG. 15. This process completes user registration. For remote-controlled driving, the user navigates to the drive page 420, as depicted in FIG. 16 to select driving commands 580 or self-driving 590.

Said rollator 100 further comprises a structure and a plurality of handles for the user to hold onto. Said plurality of mechanical hand brakes 103 are attached onto said structure from said motorized wheels 101 up to the top of said structure where a user can actuate the brake function. In the preferred embodiment of the present invention, a mechanical hand brake 103 is present for each motorized wheel 101. Said rollator 100 is designed to be light and portable. In some embodiments, said rollator 100 is designed to have foldable components and may be collapsed for storage.

Said plurality of motorized wheels 101 accelerates the present invention into motion. In the preferred embodiment of the present invention, two motorized wheels 101 are connected to the bottom of said rollator 100. In the preferred embodiment of the present invention, said motorized wheels 101 are brushless direct current (BLDC) hub motors. Said plurality of swivel wheels 102 allows the present invention to turn and rotate. In the preferred embodiment of the present invention, two swivel wheels 102 are connected to the bottom of said rollator 100.

In the preferred embodiment of the present invention, said battery 107 is a rechargeable lithium ion battery. Said battery 107 is sealed, maintenance-free, and has over thousands of recharge cycles. In the preferred embodiment of the present invention, said battery 107 may include emergency battery safety features from combustion or explosion in case of impact or damage. In the preferred embodiment of the present invention, said battery 107 is connected to said emergency battery power switch 104 which is attached to said structure of said rollator 100. Said emergency battery power switch 104 may be activated to shut off said battery 107 in case of emergency.

Said embedded computer 112 further comprises a wireless communication system 116 and 118, computer vision system 144 and an artificial intelligence algorithm 140, 142, and 146. Said computer vision system recognizes the user's face by processing each image frame from the video, then utilizes artificial intelligence technology, namely, the deep convolutional neural networks to perform user identity recognition. Once the identity of the user is derived from the computation, a region of interests (ROI) is defined with its center location and the shape parameters including width and height. The identity information, location, and shape parameters are utilized by the said artificial intelligence algorithm to compute the motion path 140 for the rollator. The motion path is fed to embedded multi-channel motor controller 120, one for each motorized wheel. Based on the computed path, said embedded computer 112 actuates said motorized wheels 101 to reposition the rollator 100 to travel in the optimal path moving towards the user. As this motion takes place, the continued computation of user identity and its distance to the rollator 100 are updated. Once the distance reaches a predefined stopping distance, the artificial intelligence algorithm will stop the motor actuation and rollator motion. Said wireless communication system may be controlled by a smartphone application or remote controller. The user can configure the present invention to self-drive to the user, remotely control the rollator 100, access the cameras 105, 106 on the rollator 100 to receive a real-time video stream. For example, a user may remotely control the present invention and use its cameras 105, 106 to view into other rooms or locations. Said artificial intelligence algorithm includes facial recognition, gesture recognition through analyzing data from the cameras and sensors. Said artificial intelligence algorithm is formed from commercially available API data with proprietary data and training guidelines.

Said front color camera 105 is a front facing camera that records environment information ahead of the rollator 100. Said rear color camera 106 is a rear facing camera that records environment information behind the rollator 100. Said environment information is fed to said computer vision system. Such information includes identity information used for facial recognition.

In the preferred embodiment of the present invention, said magnetometer 126, said acceleration sensor 124, and said impact detection sensor are found in a single combination sensor. Said combination sensor is commonly used within airplanes and drones. Said magnetometer provides compass-like information to said embedded computer 112. Said acceleration sensor provides orientation information, location information, and acceleration information to said embedded computer 112. Said impact detection sensor records any information related to collision and impact of the rollator and provides information to said embedded computer 112. The location information recorded by said combination sensor can be more reliable when used indoors, as common GPS location data may not be as reliable, accurate, or precise. Said combination sensor allows the present invention to record data that can be medically beneficial for the user. For example, said combination sensor is sensitive enough to record data of the user's gait. This data can be analyzed by a user's physician to provide instructions for the user to prevent falls and injury. This data is saved locally on said embedded computer 112 itself and can be uploaded to a private cloud server through its wireless communication. This data can be privacy locked and controlled entirely by the user through a smartphone application. As shown in FIG. 12-16, said smartphone application comprises a graphical user interface that remotely interacts with said embedded computer 112 to control the rollator 100 and adjust other settings for use, such as facial recognition.

In the preferred embodiment of the present invention, said plurality of proximity sensors comprise at least four proximity sensors. Said proximity sensors are located above said motorized wheels 101 and said swivel wheels 102 and oriented to face the rollator's front, back, left, and right sides. In the preferred embodiment of the present invention, each proximity sensor can view and record data with beyond 120 degree field of view for each sensor, covering all 360 degrees around the rollator 100 with overlapped regions. This data is characterized as a semantic description of the environment around the present invention. Said proximity sensors utilize environment data together with computer vision forms environment awareness capability to enable autonomous driving with limited functions.

Although the invention has been explained in relation to its preferred embodiment, it is to be understood that many other possible modifications and variations can be made without departing from the spirit and scope of the invention.

REFERENCES CITED

1. "A Smart Robotic Walker With Intelligent Close-Proximity Interaction Capabilities for Elderly Mobility Safety" Xiaoyang Zhao, Zhi Zhu, Mingshan Liu, Chongyu Zhao, Yafei Zhao, Jia Pan, Zheng Wang, Chuan Wu, 2020, PMID: 33192437 PMCID: PMC7642877 DOI: 10.3389/fnbot.2020.575889, NIH National Library of Medicine, https://pubmed.ncbi.nlm.nih.gov/33192437/
2. "Artificial Intelligence-Enabled Caregiving Walking Stick Powered by Ultra-Low-Frequency Human Motion", Xinge Guo, Tianyi He, Zixuan Zhang, Anxin Luo, Fei Wang, Eldwin J Ng, Yao Zhu, Huicong Liu, Chengkuo Lee, 2021, PMID: 34308631 DOI: 10.1021/acsnano.Ic04464, NIH National Library of Medicine, https://pubmed.ncbi.nlm.nih.gov/34308631/.
3. "Overground walking training with the i-Walker, a robotic servo-assistive device, enhances balance in patients with subacute stroke: a randomized controlled trial", Giovanni Morone, corresponding author Roberta Annicchiarico, Marco Iosa, Alessia Federici, Stefano Paolucci, Ulises Cortés, and Carlo Caltagirone, J Neuroeng Rehabil. 2016; 13: 47. Published online 2016 May 26. doi: 10.1186/s12984-016-0155-4, PMCID: PMC4880987, PMID: 27225043 https://www.ncbi.nlm.nih.gov/pmc/articles/PMC4880987/
4. United States Patent, Fehr et al.
   Patent No.: U.S. Pat. No. 7,383,107 B2,
   Date of Patent: Jun. 3, 2008,
   COMPUTER-CONTROLLED POWER WHEELCHAIR NAVIGATION SYSTEM
5. United States Patent, Babcock et al.
   Patent No.: U.S. Pat. No. 7,641,210 B2
   Date of Patent: Jan. 5, 2010
   HAND-DRIVEN WHEELCHAIR
6. United States Patent, Boswick et al.
   Patent No.: U.S. Pat. No. 8,087,684 B2
   Date of Patent: Jan. 3, 2012
   WHEELCHAIR ADVANTAGE MOBILITY SYSTEM
7. United States Patent, LoPresti
   Pub. No.: US 2005/0279551A1
   Pub. Date: Dec. 22, 2005
   POWER APPARATUS FOR WHEELCHAIRS
8. United States Patent, LOZANO et al.
   Pub. No.: US 2017/0266069 A1
   Pub. Date: Sep. 21, 2017
   AUTONOMOUS WHEELCHAIR

What is claimed is:

1. A battery-powered, motorized rollator comprising:

a rollator frame capable of being folded and collapsed as a whole for storage;

a plurality of brushless direct current hub motors configured to drive a plurality of motorized wheels;

a plurality of swivel wheels;

a plurality of mechanical hand brakes;

one front color camera;

one rear color camera;

a rechargeable battery comprising emergency safety features to prevent combustion or explosion upon impact or damage;

an emergency battery power switch connected to the rechargeable battery;

an instrument panel;

a control module comprising an embedded computer;

a plurality of software program modules executed by the embedded computer, the plurality of software program modules comprising a computer vision module, a deep learning module comprising deep convolutional neural networks, a path planning module, and a motor controller module;

a magnetometer, an acceleration sensor;

an impact detection sensor; and a plurality of laser-based proximity sensors;

wherein the plurality of laser-based proximity sensors comprises a plurality of point LiDAR sensors;

wherein the front color camera, the rear color camera, and the plurality of laser-based proximity sensors provide data to the deep learning module;

wherein the deep learning module processes the data using deep convolutional neural networks to infer depth and absolute distance information for autonomous path planning; and wherein the embedded computer actuates the plurality of brushless direct current hub motors based on the autonomous path planning to self-drive the rollator.

2. The battery-powered, motorized rollator of claim 1, wherein the plurality of software program modules further comprises:

a WiFi module;

a Bluetooth module;

a color camera module;

a video streaming module;

a facial recognition module;

a smartphone interface module;

a proximity sensor module;

a motion monitoring module;

a manual driving module;

an acceleration sensor module; and a customized IO module;

wherein the embedded computer executes the plurality of software program modules to realize artificial intelligence functions including path planning, facial recognition, and motor control of the rollator.

3. The battery-powered, motorized rollator of claim 1, wherein the acceleration sensor is configured to measure pitch, yaw, and roll of the rollator frame; and wherein the embedded computer uses pitch, yaw, and roll data from the acceleration sensor to adjust motor output of the plurality of brushless direct current hub motors to compensate for uphill and downhill terrain gradients.

4. The battery-powered, motorized rollator of claim 1, wherein the computer vision module performs image pre-processing on image data from the front color camera or the rear color camera comprising color balancing, segmentation, and contour analysis; wherein the computer vision module extracts feature vectors from the pre-processed data; and wherein the deep convolutional neural networks process the feature vectors to perform facial recognition to identify a registered user.

5. The battery-powered, motorized rollator of claim 4, wherein the deep learning module defines a region of interest comprising a center location, a width parameter, and a height parameter corresponding to the registered user within an image frame; and wherein the path planning module computes a motion path for the rollator based on the center location, the width parameter, and the height parameter of the region of interest.

6. The battery-powered, motorized rollator of claim 5, wherein the embedded computer continuously updates a distance to the registered user based on the region of interest during autonomous navigation; and wherein the embedded computer halts the plurality of brushless direct current hub motors upon determining that the distance has reached a predefined stopping distance from the registered user.

7. The battery-powered, motorized rollator of claim 1, wherein the plurality of laser-based proximity sensors are oriented to collectively provide a 360-degree field of view around the rollator frame; and wherein the embedded computer combines data from the plurality of laser-based proximity sensors with image data from the front color camera and the rear color camera to generate three-dimensional environmental awareness for collision avoidance during autonomous indoor navigation.

8. The battery-powered, motorized rollator of claim 1, further comprising a smartphone application; wherein the smartphone application is configured to remotely control the embedded computer to manually drive the rollator.

9. The battery-powered, motorized rollator of claim 1, further comprising a remote controller; wherein the remote controller controls the embedded computer to manually drive the rollator.

10. A battery-powered, motorized rollator comprising:

a rollator frame capable of being folded and collapsed as a whole for storage;

a plurality of brushless direct current hub motors configured to drive a plurality of motorized wheels;

a plurality of swivel wheels;

a plurality of mechanical hand brakes;

one front color camera;

one rear color camera;

a rechargeable battery comprising emergency safety features to prevent combustion or explosion upon impact or damage;

an emergency battery power switch connected to the rechargeable battery;

an instrument panel;

a control module comprising an embedded computer;

a plurality of software program modules executed by the embedded computer, the plurality of software program modules comprising a computer vision module, a deep learning module comprising deep convolutional neural networks, a path planning module, and a motor controller module;

a magnetometer, an acceleration sensor;

an impact detection sensor; and a plurality of laser-based proximity sensors;

wherein the plurality of laser-based proximity sensors comprises a plurality of point LiDAR sensors;

wherein the computer vision module performs image pre-processing on image data from the front color camera and the rear color camera and extracts a plurality of feature vectors for processing by the deep convolutional neural networks;

wherein the deep convolutional neural networks process the plurality of feature vectors to perform facial recognition of a registered user and define a region of interest comprising a center location, a width parameter, and a height parameter corresponding to the registered user within an image frame;

wherein the path planning module computes a motion path based on the center location, the width parameter, and the height parameter of the region of interest; and wherein the embedded computer actuates the plurality of brushless direct current hub motors according to the motion path to autonomously navigate the rollator towards the registered user.

11. The battery-powered, motorized rollator of claim 10, wherein the plurality of software program modules further comprises:

a WiFi module;

a Bluetooth module;

a color camera module;

a video streaming module;

a smartphone interface module;

a proximity sensor module;

a motion monitoring module;

a manual driving module;

an acceleration sensor module; and a customized IO module;

wherein the embedded computer executes the plurality of software program modules to realize artificial intelligence functions including path planning, facial recognition, and motor control of the rollator.

12. The battery-powered, motorized rollator of claim 10, wherein the deep learning module is further configured to evaluate a performance score for each execution of a driving trajectory; and wherein the deep learning module uses the performance score to reinforce subsequent path planning actions for continuous learning and adaptation of the motion path.

13. The battery-powered, motorized rollator of claim 12, wherein the embedded computer continuously updates a distance to the registered user based on the region of interest during autonomous navigation; and wherein the embedded computer halts the plurality of brushless direct current hub motors upon determining that the distance has reached a predefined stopping distance from the registered user.

14. The battery-powered, motorized rollator of claim 13, wherein the acceleration sensor is configured to measure pitch, yaw, and roll of the rollator frame; and wherein the embedded computer uses pitch, yaw, and roll data from the acceleration sensor to adjust motor output of the plurality of brushless direct current hub motors to compensate for uphill and downhill terrain gradients.

15. The battery-powered, motorized rollator of claim 14, wherein the plurality of laser-based proximity sensors are oriented to collectively provide a 360-degree field of view around the rollator; wherein the embedded computer combines data from the plurality of laser-based proximity sensors with image data from the front color camera and the rear color camera to generate three-dimensional environmental awareness for collision avoidance during autonomous navigation; and wherein the embedded computer is configured to generate and actuate a motion path in a simulated environment prior to moving to a physical environment.

16. The battery-powered, motorized rollator of claim 15, further comprising a smartphone application and a remote controller; wherein the smartphone application is configured to remotely control the embedded computer to manually drive the rollator and the remote controller is configured to remotely control the embedded computer to manually drive the rollator.

17. A battery-powered, motorized rollator comprising:

a rollator frame capable of being folded and collapsed as a whole for storage;

a plurality of brushless direct current hub motors configured to drive a plurality of motorized wheels;

a plurality of swivel wheels;

a plurality of mechanical hand brakes;

one front color camera;

one rear color camera;

a rechargeable battery comprising emergency safety features to prevent combustion or explosion upon impact or damage;

an emergency battery power switch connected to the rechargeable battery;

an instrument panel;

a control module comprising an embedded computer;

a plurality of software program modules executed by the embedded computer, the plurality of software program modules comprising a computer vision module, a deep learning module comprising deep convolutional neural networks, a path planning module, a motor controller module, and a smartphone interface module;

a magnetometer;

an acceleration sensor;

an impact detection sensor;

a plurality of laser-based proximity sensors;

a WiFi module; and a Bluetooth module;

wherein the plurality of laser-based proximity sensors comprises a plurality of point LiDAR sensors;

wherein the WiFi module and the Bluetooth module are each configured to interface with a first smartphone application associated with a user device and a second smartphone application associated with a caregiver device;

wherein the smartphone interface module is configured to arbitrate control of the rollator among an autonomous self-driving mode, a first manual control mode operated via the first smartphone application, and a second manual control mode operated via the second smartphone application;

wherein the second smartphone application is authorized to manually control the motion path of the rollator upon receiving a permission signal from the first smartphone application; and wherein the embedded computer actuates the plurality of brushless direct current hub motors based on the active control mode to drive the rollator.

18. The battery-powered, motorized rollator of claim 17, wherein the plurality of software program modules further comprise:

a color camera module;

a video streaming module;

a proximity sensor module;

a motion monitoring module;

a manual driving module;

an acceleration sensor module; and a customized IO module;

wherein the embedded computer executes software program modules to realize artificial intelligence functions including path planning facial recognition and motor control of the rollator.

19. The battery-powered, motorized rollator of claim 18, wherein the acceleration sensor is configured to measure pitch, yaw, and roll of the rollator frame; wherein the embedded computer uses pitch, yaw, and roll data from the acceleration sensor to adjust motor output of the plurality of brushless direct current hub motors for differential driving on uphill and downhill terrain; and wherein the second smartphone application allows the caregiver device to navigate the rollator on behalf of a user.

20. The battery-powered, motorized rollator of claim 19, wherein each of the first smartphone application and the second smartphone application is configured to trigger the emergency battery power switch to halt the plurality of brushless direct current hub motors.

* * * * *